United States Patent
Erpelding

(10) Patent No.: US 7,525,767 B2
(45) Date of Patent: Apr. 28, 2009

(54) SYSTEM FOR LOW PROFILE TERMINATION WITH ROBUST ALIGNMENT FOR WIRELESS SUSPENSION IN HARD DISK DRIVE

(75) Inventor: A. David Erpelding, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 444 days.

(21) Appl. No.: 11/359,123

(22) Filed: Feb. 21, 2006

(65) Prior Publication Data

US 2007/0195463 A1 Aug. 23, 2007

(51) Int. Cl.
*G11B 5/55* (2006.01)
(52) U.S. Cl. .................... 360/264.2; 360/245.8
(58) Field of Classification Search .............. 360/245.9
See application file for complete search history.

(56) References Cited

U.S. PATENT DOCUMENTS

| | | | |
|---|---|---|---|
| 5,074,029 A * | 12/1991 | Brooks et al. ............ | 29/603.03 |
| 5,600,515 A | 2/1997 | Mizuno et al. .............. | 360/104 |
| 5,661,896 A * | 9/1997 | Erpelding ................ | 29/603.01 |
| 5,956,209 A | 9/1999 | Shum .......................... | 360/104 |
| 6,477,014 B1 | 11/2002 | Erpelding ................ | 360/245.9 |
| 2005/0018356 A1 | 1/2005 | Hernandez ............... | 360/264.2 |
| 2005/0078415 A1* | 4/2005 | Tsuchiya et al. ......... | 360/245.8 |
| 2006/0118330 A1* | 6/2006 | Ooyabu et al. .............. | 174/261 |

FOREIGN PATENT DOCUMENTS

JP 2001-057040 2/2001

* cited by examiner

*Primary Examiner*—A. J. Heinz
(74) *Attorney, Agent, or Firm*—John L. Rogitz

(57) ABSTRACT

In a hard disk drive, suspension termination pads meet the flex cable termination pads at an intersecting angle. The width of these pads is approximately the same width as the conductor widths. Alignment robustness is attained by choosing an intersection angle that coincides to the arc that the wireless suspension termination pad array normally traverses during alignment.

17 Claims, 4 Drawing Sheets

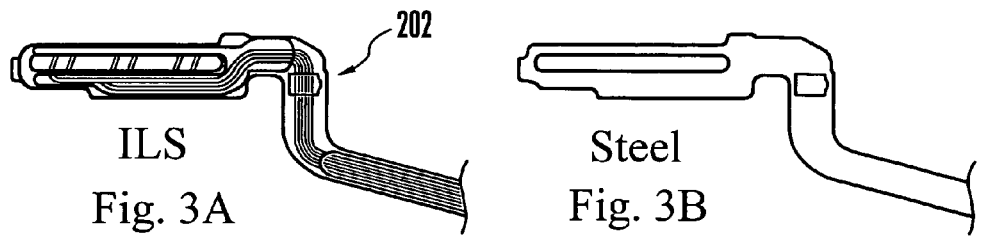
ILS
Fig. 3A
Steel
Fig. 3B
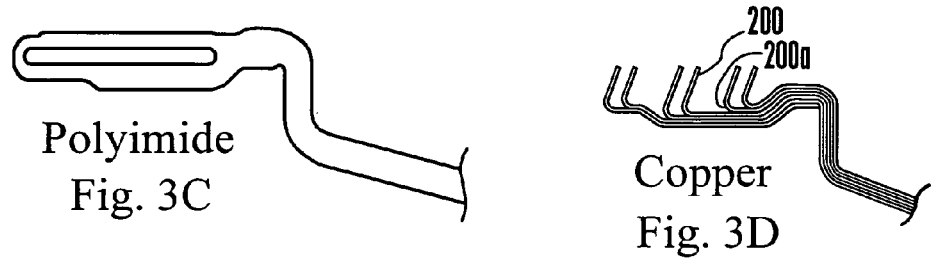
Polyimide
Fig. 3C
Copper
Fig. 3D
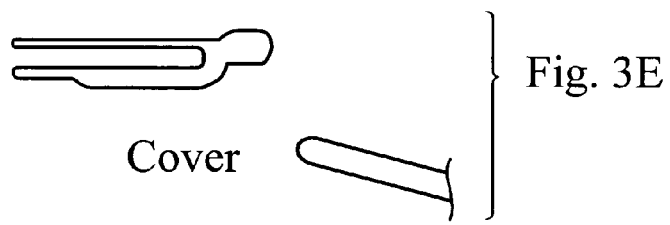
Cover
Fig. 3E
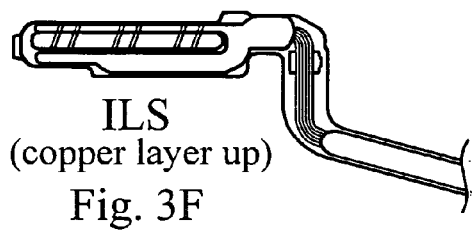
ILS
(copper layer up)
Fig. 3F
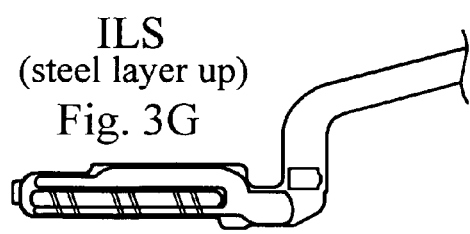
ILS
(steel layer up)
Fig. 3G Cable Pads Cable Pads

SYSTEM FOR LOW PROFILE TERMINATION WITH ROBUST ALIGNMENT FOR WIRELESS SUSPENSION IN HARD DISK DRIVE

FIELD OF THE INVENTION

The present invention relates generally to electrically connecting wireless suspensions to arm electronics (AE) cables.

BACKGROUND OF THE INVENTION

There are currently three prevalent types of wireless suspension used in the hard disk drive industry. They are Circuit Integrated Suspension (CIS), Flex on Suspension (FOS), and Integrated Lead Suspension (ILS). All differ in the manner in which they are fabricated. For the purpose of this disclosure and brevity, they will all be referred to as wireless suspensions. The embodiments in accordance with the disclosed invention are not limited by the manner in which the wireless suspension is fabricated.

The technologies used for terminating the wireless suspensions to the AE flex cable have been predominantly either solder re-flow, or ultrasonic (US) bonding. Solder re-flow technology has two approaches in use today. They are a right-angle fillet joint and a lap joint. In both approaches the wireless suspension termination pads and the AE flex cable termination pads are pre-coated, or tinned, with solder.

The fillet joint for solder termination technology relies on flattened solder pads to meet the flex cable pads at right angles. When heated the flattened solder pads of the wireless suspension become spherical and make contact with the flex cable solder pads, thus forming a right-angle fillet joint. The lap joint for solder termination technology involves the wireless suspension termination pads being exposed on all sides and overlapping the AE flex cable termination pads. Heat is applied to the wireless suspension pads and the tinned leads are fused together.

Ultrasonic termination technology is similar in design and configuration as lap joint solder re-flow technology. The primary difference is rather than being coated with solder, the wireless suspension and AE flex cable termination pads are plated, or coated with gold. The wireless suspension and AE cable termination pads are overlapped, pressed together and US energy is applied to fuse and join the termination pads.

The present invention recognizes a problem or a deficiency that arises from these termination methods. Specifically, these termination methods are detrimental to data rate. They also make it difficult to increase the number of terminations in the confined space allowed. In the case of the right-angle fillet joint, a large mound of solder results from the solder re-flow process thus creating undesirable capacitive coupling to adjacent fillet joints. Also, the pad size required to make an appropriate solder termination pad creates a discontinuity in the conductor width of the wireless suspension and the flex cable. Such discontinuities create reflection points for the data signals, which result in increased line impedance and degraded data rate performance. In the case of an overlapping joint, either solder re-flow or US, the pad size required to absorb assembly tolerances creates the aforementioned problem of discontinuity in the conductor widths. The large pad size also creates large amounts of solder, which creates a similar problem with the fillet joint of capacitive coupling.

There has been some effort to improve the right-angle fillet joint by making the fillet smaller and further spaced apart. The draw back to this is that a decrease in pad size places more challenge on the component manufacturers and assembly process. These challenges translate into higher cost due to lower yields both with components and assembly. These challenges become more difficult as the number of terminations per suspension become higher, which is the trend as the suspension is designed to allow more functions such as secondary actuation and thermally assisted fly-height control.

SUMMARY OF THE INVENTION

The disclosed invention targets the lap joint type of termination. This idea is applicable to both solder re-flow and US bonding. The core of the invention is to have the wireless suspension termination pads meet the AE flex cable termination pads at an intersecting angle. The width of these pads is approximately the same width as the conductor widths. Alignment robustness is attained by choosing an intersection angle that coincides to the arc that the wireless suspension termination pad array, or tail, normally traverses during alignment.

Accordingly, in one aspect a wireless suspension termination system includes a wireless suspension that in turn includes termination pads which are oriented tangentially to an arc swung by the wireless suspension tail during alignment of the wireless suspension termination pads to the AE cable termination pads. An AE cable is provided with termination pads oriented at an angle that is approximately equal and opposite to the orientation of the wireless suspension termination pads.

Each wireless suspension termination pad may have a width that is substantially equal to the width of a trace on the suspension that is connected to and that leads away from the wireless suspension termination pad. Likewise, each AE cable termination pad can have a width that is substantially equal to the width of the corresponding trace on the AE cable. Thus, wireless suspension termination pads and AE cable termination pads are narrow and elongated.

In another aspect, a method for connecting a suspension of a hard disk drive to an AE cable includes forming electrically conductive suspension traces on the suspension, with the suspension defining an arc of motion. The method further includes forming, for each suspension trace, a respective suspension termination pad. Each such pad is tangential to the arc of motion at the location the arc passes through the suspension pad. Moreover, the method includes orienting the AE cable termination pads, with each AE cable termination pad being associated with a respective AE cable trace. Each AE cable termination pad is oriented to cross a respective wireless suspension termination pad. Each AE cable termination pad is then engaged with a respective wireless suspension termination pad.

In still another aspect, a hard disk drive includes a suspension having a slider, a suspension trace on the suspension and electrically connected to the slider, and an AE cable that includes at least one AE cable trace terminating in an AE cable pad. Means are oriented tangentially to an arc through which the suspension moves for electrically connecting the suspension trace to the cable pad.

The details of the present invention, both as to its structure and operation, can best be understood in reference to the accompanying drawings, in which like reference numerals refer to like parts.

BRIEF DESCRIPTION OF THE DRAWINGS

FIG. 3a is a plan view of a wireless suspension tail (which in an exemplary non-limiting embodiment may be an ILS suspension) with all of its layers depicted transparently;

FIG. 3b is a plan view of the steel layer of the wireless suspension tail;

FIG. 3c is a plan view of the polyimide layer of the wireless suspension tail;

FIG. 3d is a plan view of the copper layer of the wireless suspension tail;

FIG. 3e is a plan view of the cover layer of the wireless suspension tail;

FIG. 3f is a plan view of the wireless suspension tail, the copper layer facing foremost;

FIG. 3g is a plan view of the wireless suspension tail, the steel layer facing foremost;

DETAILED DESCRIPTION OF THE PREFERRED EMBODIMENT

Figure 1:
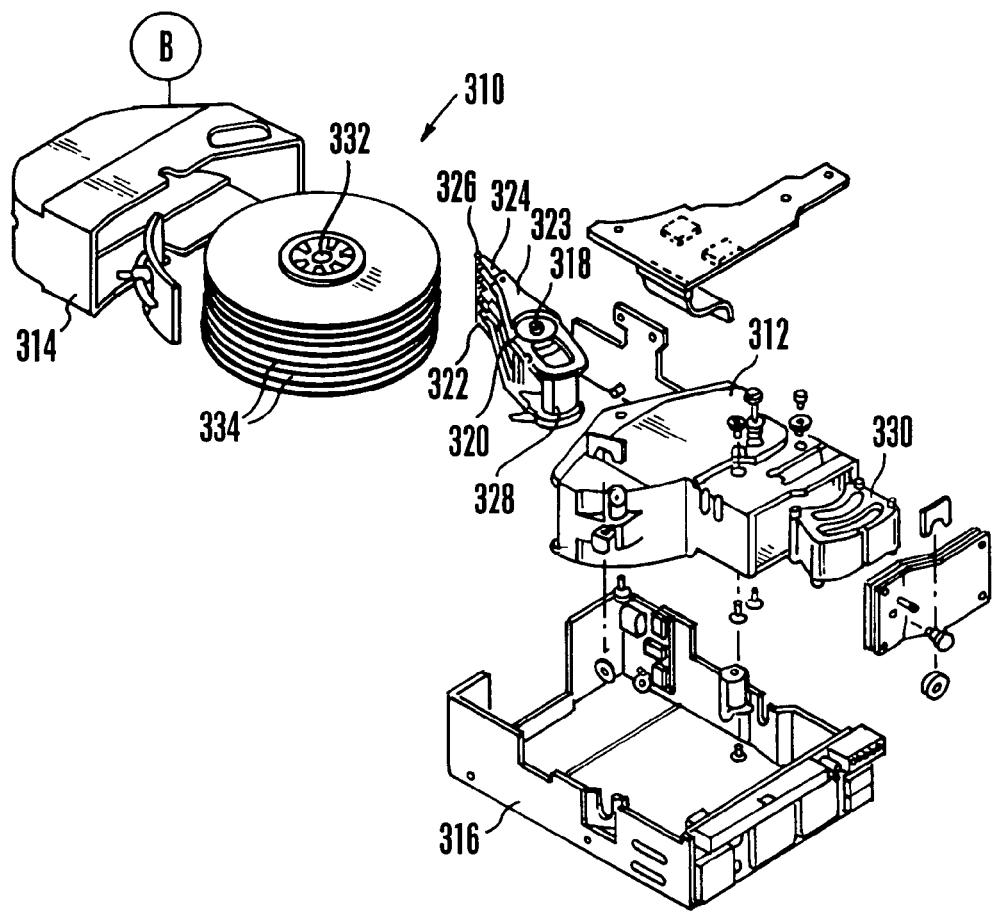
FIG. 1 is an exploded perspective view of a non-limiting hard disk drive.

Referring to FIG. 1 for a general overview of one non-limiting environment in which the present invention can be used, a rotary actuator is shown, although the invention described herein is also applicable to linear actuators.

A disk drive 310 includes a housing 312, and a housing cover 314 which, after assembly, is mounted within a frame 316. Rotatably attached within the housing 312 on an actuator shaft 318 is an actuator and assembly 320. One end of the actuator and assembly 320 may include an E block or comb like structure 322 having a plurality of actuator arms 323. Attached to the separate arms 323 on the comb or E block 322 are spring suspensions 324, and at the end of each spring suspension is a slider 326 which carries a magnetic transducer. On the other end of the actuator arm assembly opposite the spring suspensions 324 and the sliders 326 is a voice coil 328.

Attached within the housing 312 are a pair of magnets 330. The pair of magnets 330 and the voice coil 328 are parts of a voice coil motor which applies a force to the actuator assembly 320 to rotate it about the actuator shaft 318. Also mounted within the housing 312 is a spindle shaft 332. Rotatably attached to the spindle shaft 332 are a number of disks 334. In FIG. 1 eight disks are attached to the spindle shaft 332. The disks 334 are attached to the spindle shaft 332 in spaced apart relation.

Each suspension 324 can be a laminated suspension made of multiple layers of material etched using photolithographic techniques, as are well known in the industry, to create the suspension. These layers include a base layer preferably of stainless steel, an insulating layer preferably of polyimide, and a patterned conductive layer preferably of a copper alloy. This multilayered suspension may be formed by laminating three very thin sheets of different materials together, and consequently has two metal layers formed on either side of an insulating layer of polyimide that are processed using photolithographic techniques. Referring to FIGS. 3a-3i, all three layers have material removed by selective etching to form the outline of a suspension, and then both sides of the suspension are etched to remove desired sections of the steel, polyimide and copper layers to produce the various features of the suspension. In particular, the copper layer (FIG. 3d) is etched to produce the conductive lead structure which contains transmission wires and termination pads for electrically connecting the slider's transducer leads with termination pads (FIG. 3) located on the actuator arm, in accordance with disclosure below. As set forth further below, each suspension 324 electrically interconnects its attached slider with an AE cable.

Figure 2:
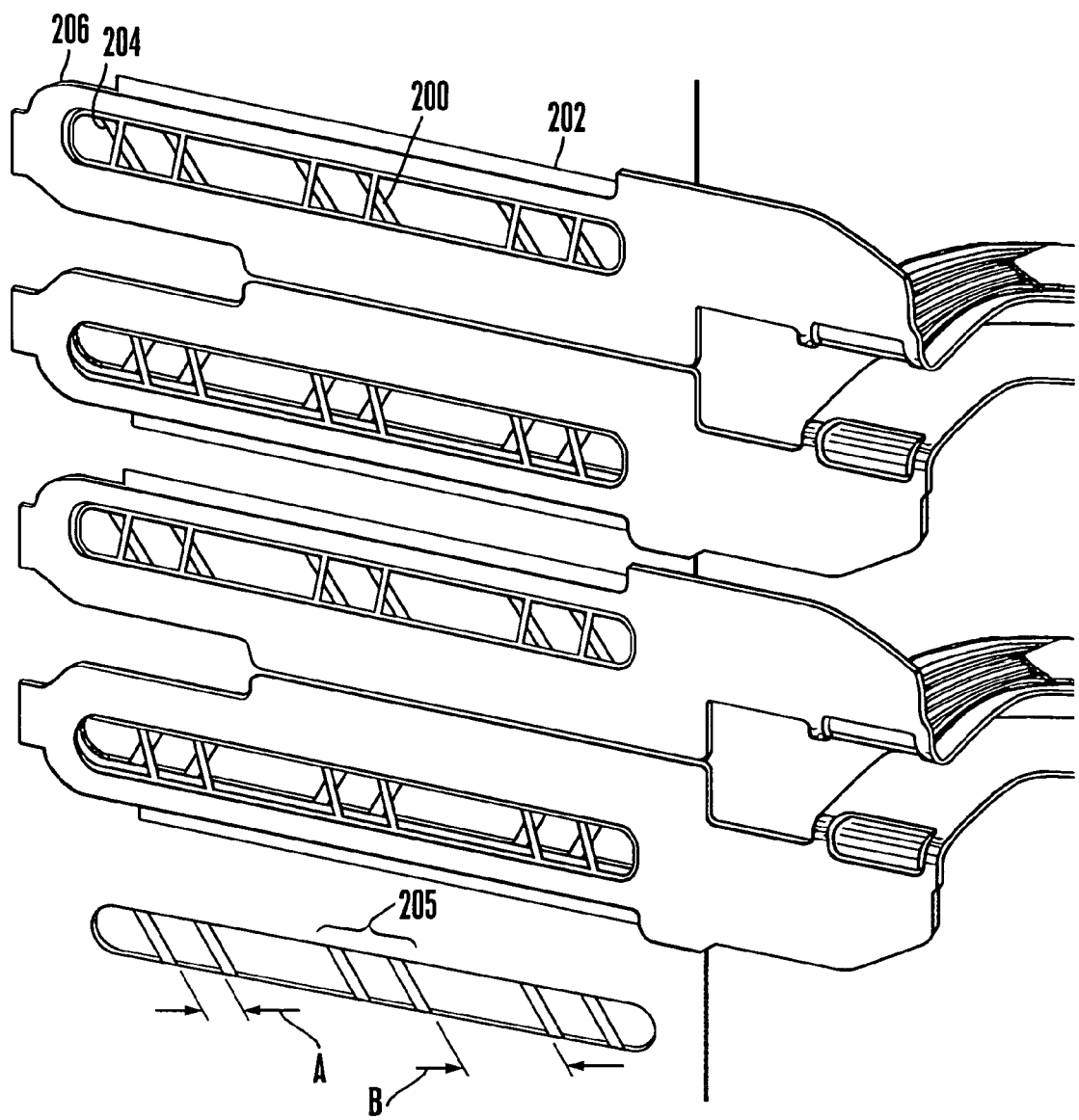
FIG. 2 is a perspective view of a wireless suspension head gimbal assemblies (HGA) tail joined to the AE cable according to present principles.
Figure 3H:
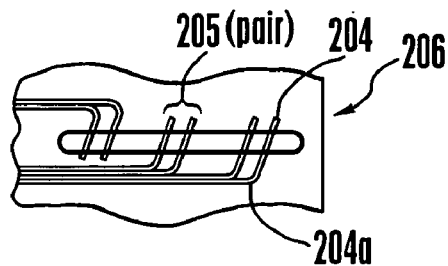
FIG. 3h is a plan view of the AE cable, depicting the termination pads transparently.
Figure 3I:
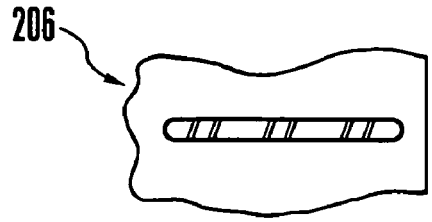
FIG. 3i is a plan view of the AE cable, facing the termination side.
Figure 4:
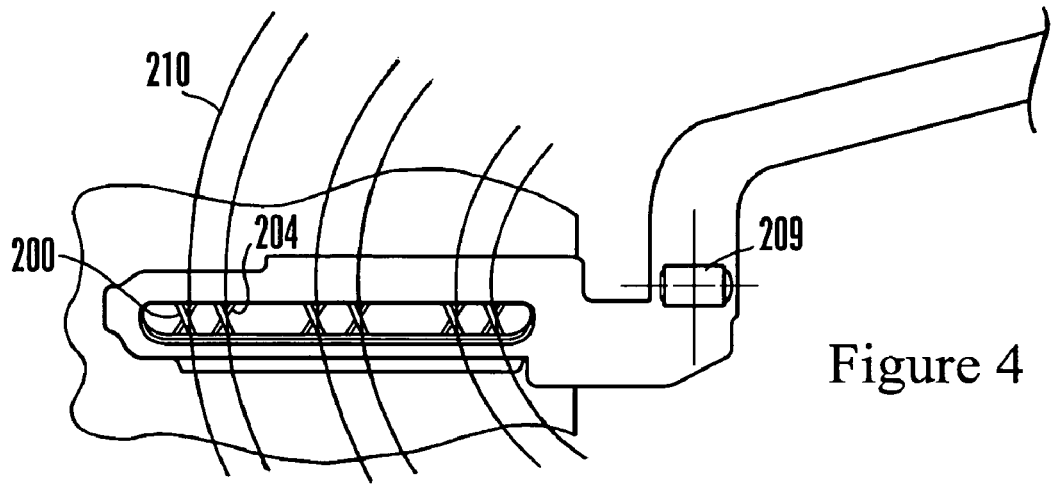
FIG. 4 is a plan view showing the suspension terminated to the AE cable and showing the termination pads with respect to the center of rotation of the suspension pad array.

With greater specificity and now referring to FIGS. 2-4, the details of the present invention can be seen. Owing to the structure shown, data signal reflection points are reduced or eliminated by keeping the width of wireless suspension termination pads 200 constant with (equal to) the width of the wireless suspension traces 200a (best shown in FIG. 3d) in each suspension tail 202 that lead to the wireless suspension termination pads 200. Also, the widths of the termination pads 204 on the AE cable 206 are approximately equal to the widths of the traces 204a of the cable. Referring to FIG. 2, the minimum space "A" between AE termination pads 204 that can be manufactured limits the distance "B" between termination pad pair 205.

FIGS. 3a-3i show various components of the suspension tail 202 and AE cable 206. FIG. 3a shows all of the layers of the present suspension tail 202, and FIGS. 3b-3e respectively show the steel, polyimide, copper, and cover layers of the suspension tail 202 shown in FIG. 3a. As discussed above, these layers can be laminated together. FIGS. 3f and 3g respectively show the suspension with the copper layer facing foremost, and the steel layer facing foremost. The present wireless suspension termination pads 200 are formed during etching of the copper layer (refer to FIG. 3d).

FIG. 3h shows the AE cable termination pads 204 and, in FIG. 3i, the AE cable 204 is shown facing the termination side.

As shown in FIGS. 3 and 4, the pads 200, 204 are narrow and elongated, and the alignment of such narrow pads 200, 204 is made possible by having the suspension pads 200 oriented along a tangent to the arc that the termination pad array normally traverses during the alignment process. As has been observed in practice, the alignment operation is primarily accomplished by a rotating motion of the suspension tail 202 about a center point 209 defined by features in the wireless suspension steel. The resulting arcs of motion are shown at 210 in FIG. 4. As FIG. 4 shows, each suspension pad 200 lies along, i.e., essentially describes, a tangent to the arc 210 at the point where the arc 210 passes through the location occupied by the suspension pad 200.

Alignment tolerance in the x and y directions is still achieved, despite the narrow pads 200, 204 by orienting the AE pads 204 at angles that intersect the suspension pads 200 as shown. Specifically, the AE cable termination pads 204 are oriented at an angle in an opposite sense relative to that of the pads 200 of the wireless suspension tail. By fabricating the wireless suspension termination pads 200 to a width equal to the width of the traces as described above, the maximum amount of space is provided for fabricating multiple wireless suspension termination pads 200. Likewise fabricating the AE pads to a width equal to the AE cable traces maximizes the space for AE cable termination pads 204.

Figure 5:
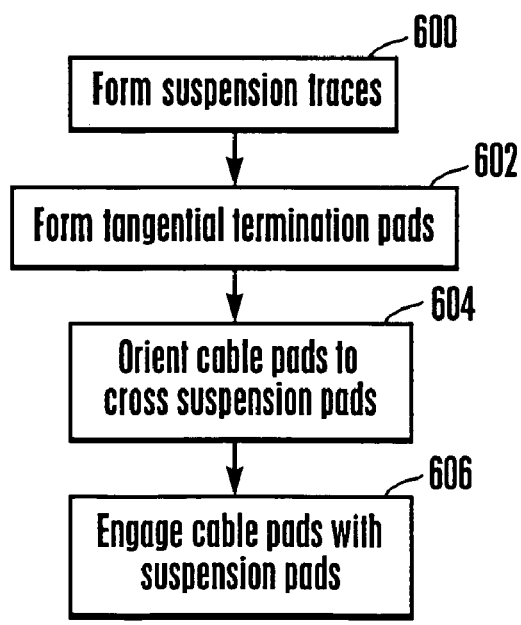
FIG. 5 is a flow chart of a method for making a non-limiting embodiment of the invention.

Now referring to FIG. 5, a non-limiting method for making the invention can be seen. Commencing at block 600, electrically conductive suspension traces on the suspension are formed. Moving to block 602, for each suspension trace, a respective suspension termination pad is formed, with each pad being tangential to the arc of motion at the location the arc passes through the suspension pad. Then, at block 604 cable termination pads are oriented on the AE cable such that each cable termination pad is associated with a respective AE cable trace and each cable termination pad is oriented to cross a respective suspension termination pad. At block 606 each cable termination pad is engaged with a respective suspension termination pad.

While the particular SYSTEM AND METHOD FOR LOW PROFILE TERMINATION WITH ROBUST ALIGNMENT FOR WIRELESS SUSPENSION IN HARD DISK DRIVE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A wireless suspension termination system comprising:
   a wireless suspension including termination pads oriented tangentially to an arc swung by a suspension tail associated with the suspension, each pad being tangential to the arc at a respective point where the arc passes through the pad; and
   an AE cable with termination pads oriented at an angle approximately equal and opposite to the orientation of the wireless suspension termination pads.

2. The system of claim 1, wherein each termination pad of the suspension has a width that is substantially equal to the width of a race on the suspension and connected to and leading away from the pad.

3. The system of claim 1, wherein each termination pad of the AE cable has a width that is substantially equal to the width of a trace on the AE cable and connected to and leading away from the pad.

4. The system of claim 1, wherein the termination pads of the suspension are narrow and elongated.

5. The system of claim 1, wherein the termination pads of the suspension are coated with gold.

6. The system of claim 1, wherein the termination pads of the suspension are coated with solder.

7. A hard disk drive, comprising:
   at least one suspension having at least one slider;
   at least one suspension trace on the suspension and electrically connected to the slider;
   at least one AE cable including at least one cable trace terminating in a cable pad; and
   means oriented tangentially to an arc through which the suspension moves for electrically connecting the suspension trace to the cable pad wherein the arc is described by the suspension during an alignment process, each means for electrically connecting being tangential to the arc at a respective point where the arc passes through the respective means for electrically connecting.

8. The hard disk drive of claim 7, wherein the means for electrically connecting is a suspension pad.

9. The system of claim 7, wherein the cable pads are coated with gold.

10. The system of claim 7, wherein the cable pads are coated with solder.

11. The hard disk drive of claim 7, wherein the width of the cable pad is substantially equal to the width of the cable trace.

12. The hard disk drive of claim 7, wherein the width of the suspension pad is substantially equal to the width of the suspension trace.

13. A wireless suspension comprising:
   termination pads oriented tangentially to an arc swung by a suspension tail associated with the pads during an alignment installation process, each pad being tangential to the arc at a respective point where the arc passes through the pad.

14. The wireless suspension of claim 13, wherein each termination pad of the suspension has a width that is substantially equal to the width of a trace on the suspension and connected to and leading away from the pad.

15. The suspension of claim 13, wherein the pads are narrow and elongated.

16. The suspension of claim 13, wherein the pads are coated with gold.

17. The suspension of claim 16, wherein the pads are coated with solder.

* * * * *